United States Patent Office 3,635,897
Patented Jan. 18, 1972

3,635,897
UNSATURATED NITRILE-MODIFIED AROMATIC HYDROCARBON-FORMALDEHYDE RESINS
Teiichi Tanigaki, Matsuyama-shi, Japan, assignor to Japan Gas Chemical Company, Inc., Tokyo, Japan
No Drawing. Filed June 24, 1969, Ser. No. 836,151
Claims priority, application Japan, Dec. 28, 1968, 44/95,961
Int. Cl. C08g 7/00, 13/00, 20/28
U.S. Cl. 260—67 A              13 Claims

ABSTRACT OF THE DISCLOSURE

Ethylenically unsaturated nitrile-modified aromatic hydrocarbon-formaldehyde resins which contain in the molecular structure an amide linkage, a reactive unsaturated group and at least one functional group selected from a methylene linkage, a di-methylene ether linkage, an acetal linkage and a methylol group are produced by effecting the ternary addition-condensation of aromatic hydrocarbon, formaldehyde and ethylenically unsaturated nitrile in an aqueous medium at an elevated temperature not exceeding 100° C. for a period of 1 to 10 hours in the presence of an acid catalyst. The resultant resins are extremely reactive and useful in paints, adhesives, rubber reinforcing materials, molding materials, laminated materials and sizing agents for papers to give them water resistance, chemical resistance, electric-insulation resistance, weathering resistance and improved mechanical characteristics.

---

The present invention relates to a novel ethylenically unsaurated nitrile-modified aromatic hydrocarbon-formaldehydre resin. In partcular, the present invention relates to an ethylenically unsaturated nitrile-modified aromatic hydrocarbon-formaldehyde resin having increased reactivity which is produced by effecting the ternary addition-condensation of an aromatic hydrocarbon, formaldehyde and an ethylenically unsaturated nitrile in the presence of an acid catalyst.

It has heretofore been well known that an aromatic hydrocarbon-formaldehyde resin wherein an aromatic hydrocarbon nucleus is bonded with a methylene linkage, a di-methylene ether linkage or an acetal linkage and further has a methylol group at the terminal position is obtained by reacting an aromatic hydrocarbon and formaldehyde in the presence of an acid catalyst such as sulfuric acid and the like. Further, it has also been well known by reason that these di-methylene ether linkages, acetal linkage and methylol groups are very reactive modified resins and can be obtained by reacting said resins with various modifiers.

However, since the oxygen-containing group in the aromatic hydrocarbon-formaldehyde resin e.g. the di-methylene ether linkage, the acetal linkage etc. is very reactive and thermally stable, the reaction of said modified resin with various modifiers has heretofore been carried out by heating at a temperature of 150° to 250° C. in the presence of an acid catalyst such as paratoluene sulfonic acid, zinc chloride and the like. For example, Japanese patent publication No. 26,982/64 discloses a process for producing a carboxylic acid modified resin by heating said resin with an ethylenically unsaturated carboxylic acid such as, for example, maleic acid in the presence of a Friedel-Crafts type catalyst.

However, a modified resin obtained by acting a nitrile group to the foregoing aromatic hydrocarbon-formaldehyde resin has not been disclosed heretofore.

The present inventors have succeeded in the production of a novel ethylenically unsaturated nitrile-modified aromatic hydrocarbon-formaldehyde resin having the functional group which is originally contained in the aromatic hydrocarbon-formaldehyde resins together with a functional group which may be expected by the introduction of an ethylenically unsaturated nitrile by effecting the ternary addition-condensation of an aromatic hydrocarbon, formaldehyde and an ethylenically unsaturated nitrile in the presence of an acid catalyst.

One of the objects of the present invention is to provide a novel ethylenically unsaturated nitrile-modified aromatic hydrocarbon-formaldehyde resin having increased reactivity.

Another object of the present invention is to provide an ethylenically unsaturated nitrile- modified aromatic hydrocarbon-formaldehyde resin containing in the molecular structure an amide linkage and a reactive unsaturated group in addition to at least one functional group selected from a methylene linkage, a di-methylene ether linkage, an acetal linkage and a methylol group which are contained in the aromatic hydrocarbon formaldehyde resin.

A further object of the present invention is to provide an ethylenically unsaturated nitrile-modified aromatic hydrocarbon-formaldehyde resin capable of being incorporated into paints, rubber reinforcing materials, molding materials, laminated materials, sizing agents for paper and the like.

The ethylenically unsaturated nitrile-modified aromatic hydrocarbon-formaldehyde resins of the present invention are produced by subjecting an aromatic hydrocarbon, formaldehyde and an ethylenically unsaturated nitrile to the ternary addition-condensation in a proportion of 1.0 to 5.0 moles of formaldehyde and 0.05 to 2.0 moles of the ethylenically unsaturated nitrile per mole of the aromatic hydrocarbon in an aqueous medium at an elevated temperature not exceeding 100° C. for 10 hours or less in the presence of 0.5 to 3.0 moles of the acid catalyst per mole of the aromatic hydrocarbon.

The ethylenically unsaturated nitrile-modified aromatic hydorcarbon-formaldehyde resins of the present invention contain a reactive unsaturated group and an amide linkage in their structures together with the functional groups contained originally in the aromatic hydrocarbon-formaldehyde resins. Further, said modified resin may take various physical forms from a viscous resin which contains small amounts of a reactive unsaturated group and an amide linkage to a solid resin which contains great amounts of a reactive unsaturated group and an amide linkage, depending upon the amounts of ethylenically unsaturated nitrile used and the reaction conditions.

The molecular weight of said modified resin is in the range of 450 to 850.

The term "an amide linkage" used herein signifies an N-substituted or N,N-disubstituted amide group, and the term "formaldehyde" used herein signifies a formaldehyde-producing material as well as formaldehyde itself.

The reactive ethylenically unsaturated nitrile-modified aromatic hydrocarbon-formaldehyde resins of the present invention are produced in accordance with the following mechanism: An aromatic hydrocarbon is first reacted with formaldehyde in the presence of an acid catalyst to produce an aromatic methylol compound, subsequently the resultant aromatic methylol compound is self-condensed to form a di-methylene ether linkage and is reacted with formaldehyde to form an acetal linkage and simultaneously said aromatic methylol compound is reacted with an ethylenically unsaturated nitrile to form an amide linkage, whereby a novel, modified, high-molecular-weight resin is produced.

By selecting adequately an amount of ethylenically unsaturated nitrile used, the ratio can be varied between the portion corresponding to the aromatic hydrocarbon-formaldeahyde resin containing a di-methylene ether linkage, an acetal linkage or a methylol group and the modified portion having an amide linkage and an unsaturated group. In consequence, resins can be optionally produced in various forms e.g. a viscous resin containing small amounts of an unsaturated group and an amide linkage or a solid resin containing large amounts of an unsaturated group and an amide linkage. The modified resins thus obtained are difficult to dissolve in benzene or chloroform when the amount of the amide linkage is large, which are readily soluble in tetrahydrofuran or methanol.

It is evident from measurement of molecular weight, the number of double bonds, contents of nitrogen and oxygen, infrared absorption spectrum and the like that the ethylenically unsaturated nitrile-modified aromatic hydrocarbon-formaldehyde resins of the present invention contain in the molecular structure an amide linkage and an unsaturated group together with at least one functional group selected from a methylene linkage, a di-methylene ether linkage, an acetal linkage and a methylol group which are contained originally in the aromatic hydrocarbon-formaldehyde resins.

In the production of the novel ethylenically unsaturated nitrile - modified aromatic hydrocarbon - formaldehyde resins of the present invention, in general, formaldehyde and an acid catalyst are first mixed in given amounts, while being, if required, cooled and the resultant mixture is maintained at a low temperature. This temperature is preferably room temperature or below. Subsequently, the desired amounts of ethylenically unsaturated nitrile and aromatic hydrocarbon are added to the resultant mixture, and thereafter the temperature is gradually raised up to the predetermined reaction temperature while violently stirring to be subjected to ternary addition-condensation reaction.

In the present invention, the sequence of charging raw materials is not limited to the foregoing procedure, however it is not desired to heat the ethylenically unsaturated nitrile and formaldehyde in the presence of an acid catalyst prior to the addition of the aromatic hydrocarbon. Further, the ethylenically unsaturated nitrile and the aromatic hydrocarbon may be added separately or in admixture to the mixture of formaldehyde and the acid catalyst.

In the case where a sudden exothermic reaction is caused on raising the temperature, it is preferred to gradually add the ethylenically unsaturated nitrile and the aromatic hydrocarbon or a mixture thereof, thereby resulting in the inhibition of production of insoluble by-products.

It is desirable to treat the reaction product thus obtained in accordance with the following procedures to isolate the objective resin. That is to say, in one of the procedures, the desired resin is obtained by separating a resinous layer and a water layer from the reaction product, washing the resultant resinous layer with hot water to remove completely the catalyst and unreacted formaldehyde, and thereafter removing the unreacted aromatic hydrocarbon and ethylenically unsaturated nitrile therefrom under the conditions that said product is not thermally condensed, namely at a temperature of 120° C. or less, preferably 100° C. or less, under a reduced pressure. In another procedure the desired resin is obtained by charging the viscous material obtained by the reaction into ice water, washing sufficiently the resultant solid material with water, and drying the solid product.

The temperature of the ternary addition-condensation reaction is not more than 100° C., preferably 65° to 85° C. The temperature above 100° C. results in the by-production of an insoluble, infusible resin and further causes hydrolysis of a reactant nitrile.

The reason why the insoluble, infusible resin mentioned above is produced may be considered to be that the amide linkage produced in accordance with the present process is hydrolyzed by heating for a long time in the presence of an acid catalyst such as sulfuric acid to be changed into an amino group (N-substituted amide group is changed to a primary amino group and N,N-disubstituted amide group is changed to a secondary amino group), and the resultant amino group is reacted with formaldehyde or an aromatic methylol compound to form cross-linkages between molecules of the modified resin. Also that double bonds introduced into the modified resin are opened by heating to form the same cross-linkages.

Accordingly, for preventing the by-production of the insoluble, infusible resins, the reaction time should be 10 hours or less, preferably 1 to 7 hours.

The aromatic hydrocarbons used in the present invention include toluene, xylene, pseudocumene, mesitylene, durene and naphthalene or alkyl derivatives thereof.

As the formaldehyde usable in the present invention, an aqueous formaldehyde solution, para-formaldehyde, trioxane and the like may be optionally used. In the case where para-formaldehyde or trioxane is used, it is desirous to add water thereto appropriately. The amount of formaldehyde used is 1.0 to 5.0 moles, preferably 2.0 to 4.0 moles, per mole of the aromatic hydrocarbon used.

The ethylenically unsaturated nitriles used in the present invention include mono-nitriles such as acrylonitrile, methacrylonitrile, crotononitrile, $\alpha$- and $\beta$-ethyl acrylonitrile and the like (these mono-nitriles may be used alone or in combination of two kinds or more thereof) and di-nitriles such as fumaronitrile, malonitrile and the like (these di-nitriles may be used alone or in combination with the forgeoing mono-nitriles).

The amount of the ethylenically unsaturated nitriles used greatly affects the composition and properties of the resulting modified aromatic hydrocarbon-formaldehyde resins. Therefore, the proportion of the ethylenically unsaturated nitriles to the aromatic hydrocarbons should be adequately changed depending upon the usages of said modified resins, but in general, it is preferred to use 0.05 to 2.0 moles of the ethylenically unsaturated nitriles per mole of the aromatic hydrocarbons.

In the present invention, the amount of the catalyst is one of the essential factors affecting noticeably the reaction. As explained hereinbefore, the composition of the ethylenically unsaturated nitrile-modified aromatic hydrocarbon-formaldehyde resins obtained by the ternary addition-condensation reaction, namely the number of double bonds in a molecule of said modified resins, is dependent upon the amount of the ethylenically unsaturated nitriles used. Furthermore, the number of double bonds may be also changed by varying the amount of a catalyst used and in general, is increased as the amount of the catalyst is increased. On the other hand, however, the amount of insoluble, infusible compound in the resultant modified resins is apparently increased as the said number of double bonds is increased. That is to say, since the hydrolysis of an amide linkage is readily influenced by a concentration of the catalyst, the increase in the amount of the catalyst used results in the conversion of the amide linkage into the amino group. For that reason, the above-described cross-linking reaction due to the addition of formaldehyde to the amino group is the cause the resins are insoluble and infusible. Accordingly, the amount of the catalyst used should be carefully selected in the present invention. In general, it is suitable to use 0.5 to 3.0 moles of the catalyst per mole of the aromatic hydrocarbons. Further, it is desirable to maintain the concentration of the catalyst in a water layer containing formaldehyde in the reaction system at 10 to 70% by weight, preferably at 15 to 40% by weight. The catalysts used in the present invention include sulfuric acid, phosphoric acid, p-toluene sulfonic acid, formic acid, a mixture thereof, a mixture of sulfuric acid and acetic acid and the like.

The ethylenically unsaturated nitrile-modified aromatic hydrocarbon-formaldehyde resins thus produced according to the present invention contain in a molecule a functional group such as a di-methylene ether linkage, an acetal linkage, a methylol group, an amide linkage and an unsaturated group, and therefore may be used in wide ranges where the reactivity of said functional group is usable. For example, said modified resins are self-cured when heated at a temperature exceeding 150° C., and more readily cured in the presence of an acid catalyst. Using the resins of this invention, a molding material can be obtained by mixing, kneading and crushing said resins with the addition of an adequate filler. Further, the reactivity of a double bond is a usable feature, for example, in cooking with a drying oil to obtain an alkyd resin, paint, or when mixed with an unsaturated polyester resin, said resins act as a cross-linking agent. Furthermore, the secondary modification of the present resins can be made with phenols, melamines, carboxylic acids and the like. As described above, due to the high reactivity, the present modified resins are widely useful for paints, adhesives, rubber reinforcing materials, molding materials, laminated materials, resins for brake-lining, sizing agents for papers and the like. The employment of said modified resins brings about water resistance, chemical resistance, electric insulation resistance, weathering resistance or excellent mechanical characteristics.

As explained above in detail, the ethylenically unsaturated nitrile-modified aromatic hydrocarbon-formaldehyde resins of the present invention are produced by the ternary addition-condensation of the aromatic hydrocarbons, formaldehyde and ethylenically unsaturated nitriles, which have a novel structure and a high reactivity, and this process is different from known processes for modification of the aromatic hydrocarbon-formaldehyde resins. The present resins have the wide range of uses and have excellent characteristics.

The present invention will be further illustrated with reference to the following examples. All parts and percentages referred to therein are by weight.

EXAMPLE 1

To a 4 necked flask provided with a thermometer, reflux condenser and stirrer and installed in an ice water bath was charged 162 parts of 37% aqueous solution of formaldehyde and was gradually added with stirring 147 parts of conc. sulfuric acid. Subsequently, 53 parts of acrylonitrile and 106 parts of m-xylene were added to the resultant mixture and a temperature was raised up to 80° C. while stirring vigorously to effect the reaction. As the reaction proceeded, the reaction solution became muddy to white and viscous. After 3 hours' reaction, the reaction solution was placed in ice water to obtain a white solid resin. After crushing the resin, washing with water and then drying the resultant resin, there were obtained 163 parts of a white solid resin. After dissolving the resultant resin once in tetrahydrofuran to remove an insoluble portion and then distilling off the solvent, there were obtained 126 parts of a soluble solid resin.

The resin thus obtained was soluble in methanol but insoluble or difficult to dissolve in benzene or chloroform. The molecular weight thereof was 790 after measurement in accordance with the vapor pressure equilibrium method wherein tetrahydrofuran was used as a solvent. It was found from the quantitative analysis of double bonds by means of bromine chloride that a molecule of the resin contained an average 2.4 double bonds. Further, the nitrogen content was 4.95%.

EXAMPLE 2

Into the same device as in Example 1 were charged 75 parts of 80% para-formaldehyde and 150 parts of 50% sulfuric acid were added gradually thereto while cooling and stirring. Subsequently, 27 parts of acrylonitrile and 106 parts of m-xylene were added to the resultant mixture while stirring vigorously and the temperature was raised up to 90° C. to effect the reaction for 3 hours. Treating with water in the same manner as in Example 1, there were obtained 156 parts of solid resin. Dissolving the resultant resin in tetrahydrofuran to separate an insoluble portion, there were obtained 135 parts of a soluble solid resin. Analyzing the resultant resin in the same manner as in Example 1, it was found that the molecular weight was 550, the number of double bonds in a molecule was 1.0 and the nitrogen content was 3.32%. In infrared absorption spectrums of the resultant resin, characteristic absorptions based on stretching and deformation vibrations of N—H were shown at 3300 cm.$^{-1}$ and 1545 cm.$^{-1}$, characteristic absorptions based on stretching vibrations of methyl and methylene groups at 2800 to 3100 cm.$^{-1}$, a characteristic absorption of $>C=O$ of amide I at 1650 cm.$^{-1}$, a characteristic absorption based on stretching vibration of C=C at 1620 cm.$^{-1}$ and a characteristic absorption based on stretching vibration of C—O—C at 1060 cm.$^{-1}$ respectively. From these results, it was found that the resin obtained was a xyleneformaldehyde resin containing an amide linkage, an unsaturated group, dimethylene ether linkage and the like in a molecule.

EXAMPLE 3

Into the same reaction device as in Example 1 were charged 215 parts of 37% aqueous solution of formaldehyde were charged and 147 parts of conc. sulfuric acid was gradually added thereto while cooling and stirring. Thereafter, 34 parts of crotononitrile and 160 parts of m-xylene were added to the resultant mixture and a temperature was raised up to 90° C. to effect the reaction for 3 hours while stirring vigorously. After the completion of reaction, separating a water layer from an organic layer, dissolving the resultant organic layer in chloroform to wash sufficiently, and then distilling off chloroform under normal pressure and the unreacted m-xylene and crotononitrile under a reduced pressure of 100 mm. Hg therefrom, there was obtained 217 parts of a semi-solid resin. The resultant resin did not contain an insoluble portion at all. The molecular weight thereof was 520, the number of double bonds in a molecule was 0.7 and the nitrogen content was 2.44%.

EXAMPLE 4

There were charged 60 parts of trioxane into the same reaction device as in Example 1, 440 parts of 50% sulfuric acid was gradually added thereto while stirring and then the resultant mixture was ice-cooled so at to be maintained at room temperature. Subsequently, 106 parts of m-xylene and 53 parts of acrylonitrile were added to the resultant mixture, and the temperature was raised up to 60° C. to react for 2 hours. Treating the resultant product in the same manner as in Example 1, there was obtained 215 parts of a resin. Dissolving the resultant resin in tetrahydrofuran and separating off an insoluble portion therefrom, there was obtained 190 parts of a soluble resin. The molecular weight thereof was 550, the number of double bonds in a molecule was 1.7 and the nitrogen content was 3.36%. Further, the resultant solid resin was soluble in methanol but difficult to dissolve in chloroform.

EXAMPLE 5

Into the same reactor as in Example 1 were charged 112 parts of 80% para-formaldehyde and 200 parts of 50% sulfuric acid was gradually added thereto while cooling and stirring. Then 92 parts of toluene and 117 parts of fumaronitrile were added to the resultant mixture while vigorously stirring and the temperature was raised up to 90° C. to react for 4 hours. Treating the resultant product in ice-water in the same manner as in Example 1, there was obtained 255 parts of a white solid resin. Dissolving the resultant resin in tetrahydrofuran and removing an insoluble portion therefrom, there was obtained 216 parts of a soluble resin. The resultant resin was a white solid soluble in methanol. The molecular weight thereof was 810, the number of double bonds in a molecule was 2.1 and the nitrogen content was 8.41%.

EXAMPLE 6

There were charged 162 parts of a 37% aqueous solution of formaldehyde into the same reactor as in Example 1 and 170 parts of 85% phosphoric acid was added gradually thereto while cooling and stirring. Then, 106 parts of m-xylene and 68 parts of methacrylonitrile were added to the resultant mixture and a temperature was raised up to 90° C. to react for 2 hours at said temperature. Treating the resultant product in ice-water in the same manner as in Example 1, there was obtained 187 parts of a white solid resin. Dissolving the resultant resin in tetrahydrofuran and removing an insoluble portion therefrom, there was obtained 150 parts of a soluble resin. The resultant resin was a solid resin soluble in methanol but difficult to dissolve in chloroform and having a molecular weight of 830, a number of double bonds in a molecule of 2.3 and a nitrogen content of 4.83%.

What is claimed is:

1. An ethylenically unsaturated nitrile-modified aromatic hydrocarbon-formaldehyde resin having a molecular weight of 450 to 850 and containing in the molecular structure an amide linkage, an $\alpha,\beta$-ethylenically unsaturated group and at least one member selected from the group consisting of a methylene linkage, a dimethylene ether linkage, and acetal linkage and a methylol group, which is obtained by reacting in an aqueous medium an aromatic hydrocarbon selected from the group consisting of toluene, xylene, pseudocumene, mesitylene, durene and naphthalene, formaldehyde in proportion of 1.0 to 5.0 moles per mole of the aromatic hydrocarbon, and at least one ethylenically unsaturated nitrile selected from the group consisting of acrylonitrile, methacrylonitrile, crotonitrile, $\alpha$- and $\beta$-ethylacrylonitrile, fumaronitrile and malonitrile in proportion of 0.5 to 2.0 moles per mole of the aromatic hydrocarbon, at an elevated temperature not exceeding 100° C. for a period of 10 hours or less in the presence of an acid catalyst.

2. The resin in accordance with claim 1 wherein formaldehyde is first mixed with the acid catalyst, and the ethylenically unsaturated nitrile and the aromatic hydrocarbon are added to the resultant mixture.

3. The resin in accordance with claim 1 wherein the ternary addition-condensation reaction is carried out at a temperature of 65° to 85° C.

4. The resin in accordance with claim 1 wherein the reaction time is 1 to 7 hours.

5. The resin in accordance with claim 1 wherein the amount of formaldehyde is 2.0 to 4.0 moles per mole of the aromatic hydrocarbon.

6. The resin in accordance with claim 1 wherein the formaldehyde is an aqueous solution of formaldehyde, para-formaldehyde or trioxane.

7. The resin in accordance with claim 1 wherein the nitrile is selected from the group consisting of acrylonitrile, methacrylonitrile, crotononitrile, and $\alpha$- and $\beta$-ethyl acrylonitrile.

8. The resin in accordance with claim 1 wherein the nitrile is fumaronitrile or malonitrile.

9. The resin in accordance with claim 1 wherein the acid catalyst is selected from the group consisting of sulfuric acid, phosphoric acid, p-toluene sulfonic acid, formic acid, a mixture thereof and a mixture of sulfuric acid and acetic acid.

10. The resin in accordance with claim 1 wherein the concentration of the catalyst in a water layer containing the formaldehyde is 10 to 70% by weight.

11. The resin in accordance with claim 10 wherein the concentration of the catalyst is 15 to 40% by weight.

12. A product according to claim 1, wherein there are used 0.5 to 3.0 moles of catalyst per mole of aromatic hydrocarbon.

13. A product according to claim 12 wherein the catalyst is selected from the group consisting of sulfuric acid, phosphoric acid, p-toluene sulfonic acid, formic acid, a mixture thereof and a mixture of sulfuric acid and acetic acid.

References Cited

UNITED STATES PATENTS

| 3,231,544 | 1/1966 | Cotman et al. | 260—67 A |
| 3,296,210 | 1/1967 | Wilson et al. | 260—73 |
| 3,364,180 | 1/1968 | Gutweiler et al. | 260—73 |
| 3,391,121 | 7/1968 | Kiss | 260—67 A |
| 3,405,079 | 10/1968 | Huang et al. | 260—67 A X |
| 3,513,221 | 5/1970 | Huang et al. | 260—67 A X |

WILLIAM H. SHORT, Primary Examiner

L. M. PHYNES, Assistant Examiner

U.S. Cl. X.R.

260—33.4, 57, 67.6, 72, 73